United States Patent [19]

Yip et al.

[11] Patent Number: 4,561,023
[45] Date of Patent: Dec. 24, 1985

[54] DAMPENING SYSTEM FOR MICRO-DEFLECTOR SCANNING BEAM MODULATOR

[75] Inventors: Kwok-leung Yip, Webster; Martin E. Banton, Fairport, both of N.Y.

[73] Assignee: Xerox Corporation, Stamford, Conn.

[21] Appl. No.: 523,983

[22] Filed: Aug. 16, 1983

[51] Int. Cl.[4] ................................................ H04N 1/04
[52] U.S. Cl. ..................................... 358/208; 358/293
[58] Field of Search ............... 358/206, 208, 293, 294, 358/300, 302, 285

[56] References Cited

U.S. PATENT DOCUMENTS

| | | | |
|---|---|---|---|
| 3,544,201 | 12/1970 | Fowler et al. | 350/285 |
| 4,368,489 | 1/1983 | Stemme | 358/208 |
| 4,385,798 | 5/1983 | Yevick . | |
| 4,397,521 | 8/1983 | Antos . | |
| 4,441,126 | 4/1984 | Greenig | 358/293 |
| 4,450,458 | 5/1984 | Araghi | 358/293 |
| 4,454,547 | 6/1984 | Yip | 358/293 |

FOREIGN PATENT DOCUMENTS 2417000  10/1974  Fed. Rep. of Germany .

OTHER PUBLICATIONS

Applied Physics Letters, vol. 31, No. 8, Oct. 15, '77, K. E. Petersen, p. 521.
IEEE Transactions on Electron Devices, vol. Ed-25, No. 10, Oct. 1978, K. E. Petersen, p. 1241.

Primary Examiner—Howard W. Britton
Attorney, Agent, or Firm—Frederick E. McMullen

[57] ABSTRACT

A micro-deflector comprised of one or more flexible reflector fingers athwart the path of a beam of high intensity light in a raster scanner, the fingers deflecting on the application of a bending potential thereto to guide the light impinging thereagainst along a different path, together with means to speed up restoration of the fingers to an undeflected quiescent position following removal of the bending potential through the application of a dampening potential to the fingers as the fingers approach the undeflected position.

9 Claims, 8 Drawing Figures

VOLTAGE PROFILE APPLIED TO MICRODEFLECTOR

VOLTAGE PROFILE APPLIED TO MICRODEFLECTOR

CORRESPONDING ANGULAR DEFLECTION OF MICRODEFLECTOR

DAMPENING SYSTEM FOR MICRO-DEFLECTOR SCANNING BEAM MODULATOR

The invention relates to micro-deflectors, and more particularly, to a control for reducing the time required for a micro-deflector to return to an undeflected position.

Micro-deflectors, which basically comprise one or more flexible fingers having a reflective surface which permits the finger to function as a light reflector, find use in many applications. One application, for example, uses a micro-deflector as a facet tracker in a raster scanning system. In yet another use, a linear array of micro-deflectors forms a full width modulator for modulating a sheet-like beam of light in response to a video image signal input. In these and other applications, the flexible finger and fingers that comprise the micro-deflector bend or deflect in response to the application of an electrical potential. Thus, light striking the finger or fingers is directed into a selected path depending upon the presence or absence of an electrical potential.

Where for example a linear micro-deflector array is used, a deflecting potential is selectively applied to individual fingers in accordance with a video image signal input. The selective deflection of differennt ones of the micro-deflector fingers modulates the scanning beam and exposes the recording medium to create the image represented by the image signals. Similarly, in the case of a micro-deflector type facet tracker, the application of controlled potentials to the micro-deflector's flexible finger bends the finger so that the scanning beam striking the finger is tracked to maintain the point at which the beam impinges on the reflective facets of the scanning element substantially centered.

However, it has been found, particularly in high speed applications, that the time interval required for the micro-deflector's finger or fingers to settle back into the undeflected position and to stop vibrating following removal of the electrical potential may be of such duration as to restrict system operating speed. While the recovery time of the finger may be enhanced by changing the finger's physical parameters, ie, by making the finger thicker, changes of this nature are usually accompanied by undesirable side effects. For example, where the thickness of the finger is increased, a consequent steep increase in the potential required to bend or deflect the finger is necessary if the requisite deflection is to be obtained within the time constraints of the system. Alternately, one might consider providing a physical stop or abutment to intercept and stop the finger at the neutral position and settle vibrations. However, stops of this nature may not dampen out all vibrations along the length of the flexible finger and could result in undesirable wear and fatigue of the finger.

The invention relates to an improved system for speeding up the return of a micro-deflector to an undeflected quiescent position in preparation for the next cycle, the micro-deflector including at least one flexible finger having a mirror-like surface for reflecting a beam impinged thereagainst, and a support permitting the finger to deflect in response to the application of an electrical potential thereto whereby the beam striking the finger is reflected in another direction, the improvement comprising: means to impose an electrical potential on the finger as the finger is returning to the undeflected position following removal of the first mentioned potential to dampen oscillations of the finger and speed up return of the finger to the undeflected quiescent postion.

IN THE DRAWINGS

Figure 1:
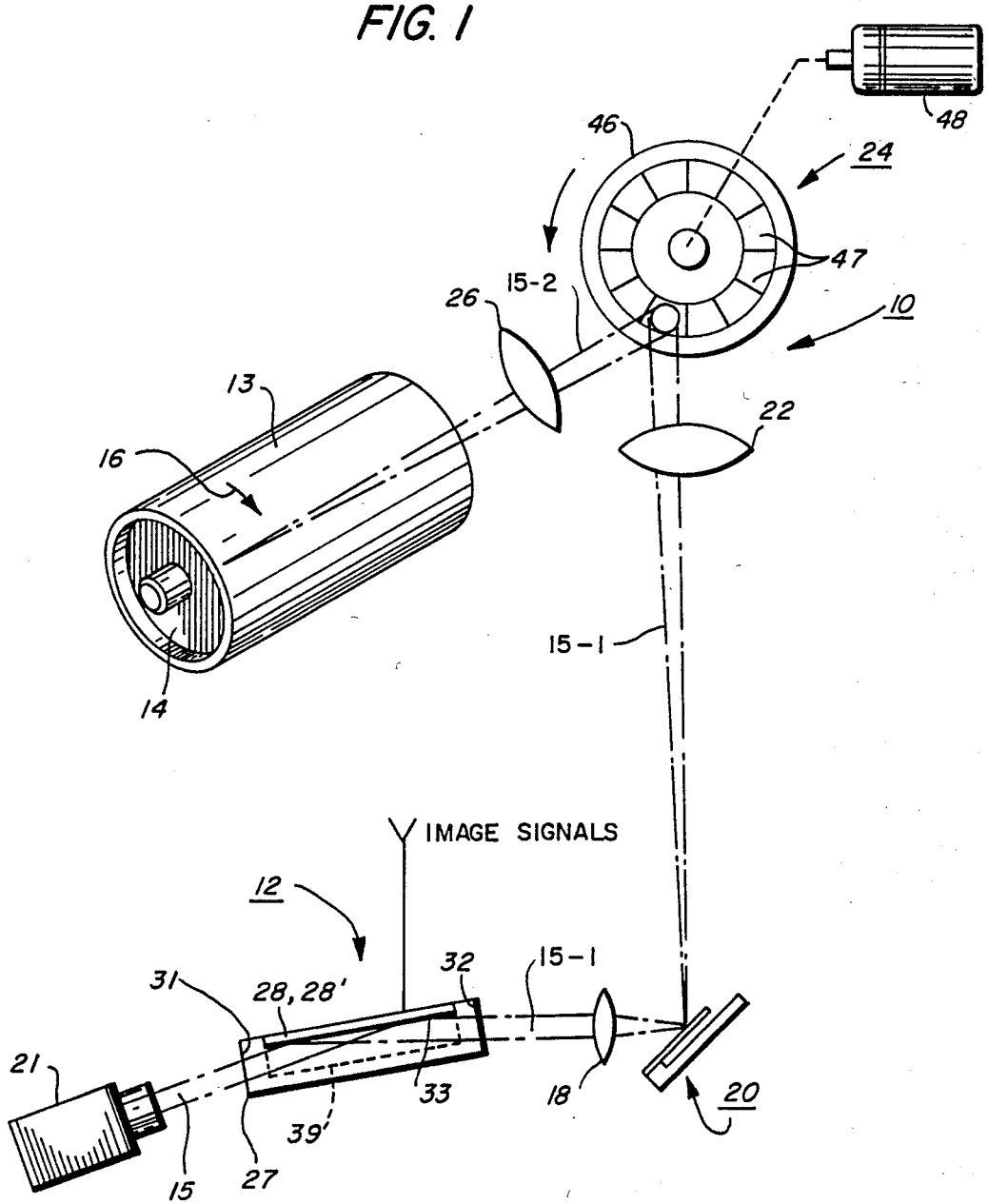
FIG. 1 is a schematic view of the improved micro-deflector of the present invention embodied in a facet tracker for a raster scanner of the type having a total internal reflection (TIR) modulator and holographic scanning disc.
Figure 2:
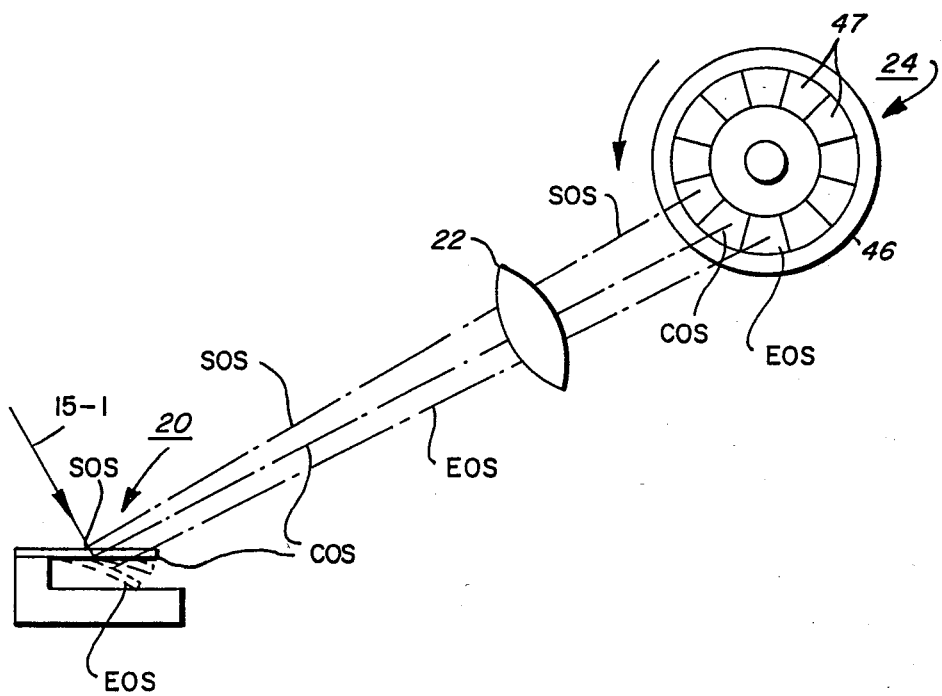
FIG. 2 is a schematic view illustrating the manner in which facet tracking is effected by the facet tracker shown in FIG. 1.
Figure 3:
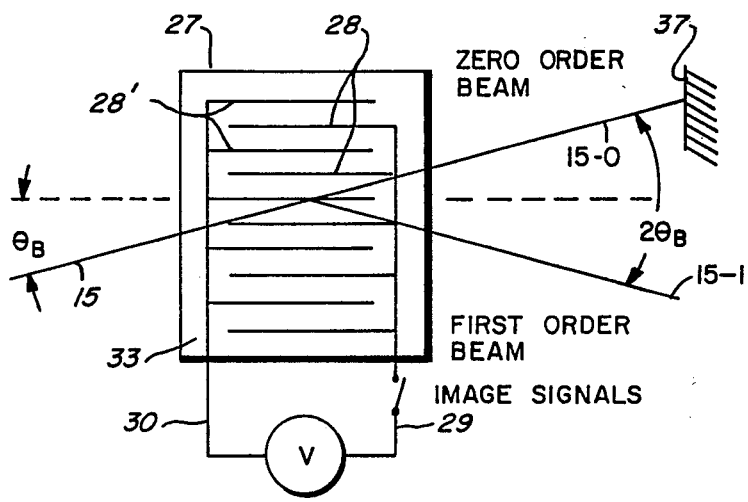
FIG. 3 is an enlarged bottom plan view showing details of the TIR modulator for the scanner shown in FIG. 1.

Referring particularly to FIGS. 1-3 of the drawings, an exemplary raster scanner, designated generally by the numeral 10, incorporating the micro-deflector of the present invention is there shown. Raster scanner 10 comprises a Raster Output Scanner or ROS type scanner wherein a beam 15 of high intensity radiation, ie, light, modulated in accordance with image signals, is scanned across a photosensitive recording medium 13 to expose the recording medium in an image configuration. The recording medium 13 is depicted as being a photoconductively coated xerographic drum 14 which is rotated (by means not shown) in the direction of arrow 16. Nevertheless, it will be understood that other xerographic and non-xerographic recording media may instead be used, including photoconductively coated xerographic belts and plates, as well as photosensitive film and coated paper in web or cut sheet stock form. Accordingly, the recording medium 13 should be visualized in the generalized case as being a photosensitive medium which is exposed while advancing in a cross line or line pitch direction relative to the scanning beam (identified by numeral 15-2 herein as will appear).

Beam 15 is derived from a suitable flux source of electro-magnetic radiation such as laser 21. The collimated beam 15 of monochromatic radiation generated by laser 21 is impinged on a modulator 12 which modifies the beam 15 in conformance with information contained in image signals input thereto as will appear. The modulated beam 15-1 passes through a telecentric telescopic beam expander 18 to facet tracker 20 and from facet tracker 20 through a second telecentric telescopic beam expander 22 to a holographic type scanning deflector 24. From deflector 24, the beam is focused by imaging lens 26 onto the recording medium 13.

Modulator 12 is a Total Internal Reflection (ie, TIR) type modulator having an electro-optic base or element 27 with plural addressable electrodes 28, 28' distributed in succession across a portion of the electro-optic element 27 commensurate with the effective size of beam 15. Typically, the electrodes 28, 28' are 1–30 microns wide and are on centers which are more or less equidistantly separated to provide a generally uniform interelectrode gap spacing of 1–30 microns.

Electro-optic element 27 comprises a y-cut crystal of $LiNbO_3$ for example having optically polished input and output faces 31, 32 at the ends thereof, and optically polished intermediate reflecting surface 33. Interdigited electrodes 28, 28' are engaged with, or at least closely adjacent to, the reflecting surface 33 to couple the electric fringe fields which are created into the electro-optic element 27. Electrodes 28, 28' are coupled across a suitable potential V' through leads 29, 30, application of potential V' to electrodes 28, 28' being controlled in response to the image signal content.

As can be understood, the collimated beam 15 from laser 21 enters the electro-optic element 27 through input face 31 at a grazing angle of incidence relative to the reflecting surface 33. Beam 15 is brought to a wedge shaped focus (by means not shown) at approximately the longitudinal centerline of the reflecting surface 33 where it is totally internally reflected and exits from the electro-optic element 27 through the output face 32. While passing through the electro-optic element 27, the beam 15 is spatially phase front modulated in accordance with the image signal content.

Differences in potential between electrodes 28, 28' create localized electric fringe fields which penetrate into an interaction region 39 of the electro-optic element 27 to produce a variation in the element's refractive index widthwise of the interaction region. Consequently, as the beam 15 is traversing the interaction region 39, its phase front is sequentially spatially modulated in accordance with the image signal input.

When operated in the Bragg regime (shown in FIG. 3), where there is no phase alteration, light entering the electro-optic element 27 at the Bragg angle $\theta_B$ is undiffracted and emerges as zeroth order beam 15-0. In the example shown, zeroth order beam 15-0 is imaged against a suitable stop 37. Where the voltage V' is applied across the electrodes 28, 28', a phase change occurs and the light is scattered into first order beam 15-1 which as will appear is utilized to expose the recording medium 13.

While a Bragg diffraction regime is illustrated, electro-optic element 27 may be operated in the Raman-Nath regime as will be understood by those skilled in the art. Other modulator types such as acousto-optic, or electro-optic, etc., as well as laser diodes may instead be envisioned. And while first order beam 15-1 serves as the source of scanning beam 15-2, zeroth order beam 15-0 may instead be used. In that circumstance, first order beam 15-1 would be impinged against stop 37.

Deflector 24 comprises a holographic type deflector with a substantially flat scanning disc 46 having a plurality of grating faces or facets 47 around the outer periphery thereof. Scanning disc 46, which is preferably made from glass, is rotated by means of motor 48 in synchronism with movement of drum 14. Preferably, disc 46 is disposed so that the first order beam 15-1 is incident to the facets 47 thereof at an angle of substantially 45°. The diffracted scanning beam 15-2 output by disc 46 exits at a complementary angle.

First order beam 15-1 passes through beam expanders 18, 22 and facet tracker 20 to deflector 24, expanders 18, 22 serving to provide controlled expansion to the beam 15-1 to impinge a beam of desired spot size onto facets 47 of scanning disc 46. As will appear more fully herein, facet tracker 20 serves to track the first order beam 15-1 impinging on facets 47 of scanning disc 46 to maintain the beam spot in predetermined position on the facets 47 of scanning disc 46. The first order beam 15-1 reflected by facets 47 of scanning disc 46 (referred to herein as scanning beam 15-2) is focused by imaging lens 26 to a selected spot in the focal plane proximate the surface of drum 14.

Figure 5:
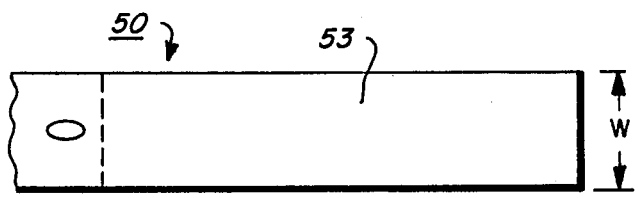
FIG. 5 is a top plan view of the flexible finger shown in FIG. 4.
Figure 4:
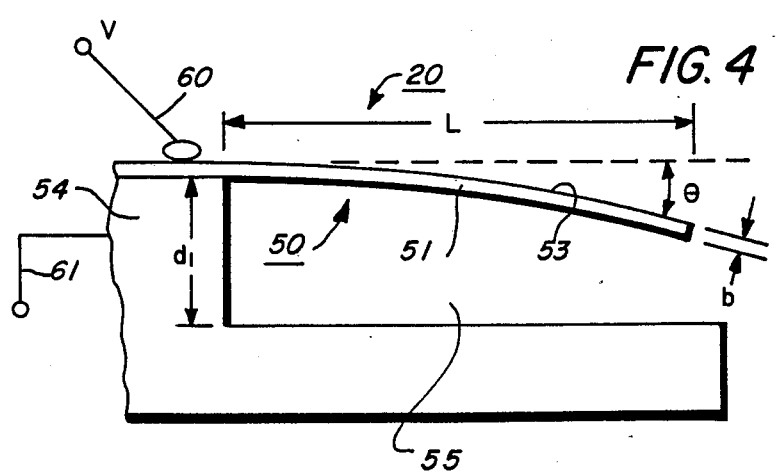
FIG. 4 is an enlarged side view in cross section of the micro-deflector type facet tracker of FIG. 1 showing the facet tracker's flexible finger.

Referring particularly to FIGS. 4 and 5 of the drawings, facet tracker 20 is of the micro-deflector type having a flexible finger 50 preferably comprised of silicon dioxide 51 suitably provided on the surface of a silicon wafer 54 as by deposition, thermal oxidation, etc. Other materials such as silicon, silicon nitride, etc. may be envisioned. A metallic mirror-like reflective coating 53 is provided on the outer surface of finger 50. The portion of wafer 54 below finger 50 is removed creating a space 55 below finger 50 permitting the free end of finger 50 to deflect as illustrated in FIG. 4. A lead 60 is provided for applying electrical potential to finger 50 with common or return lead 61 coupled to wafer 54.

Figure 6:
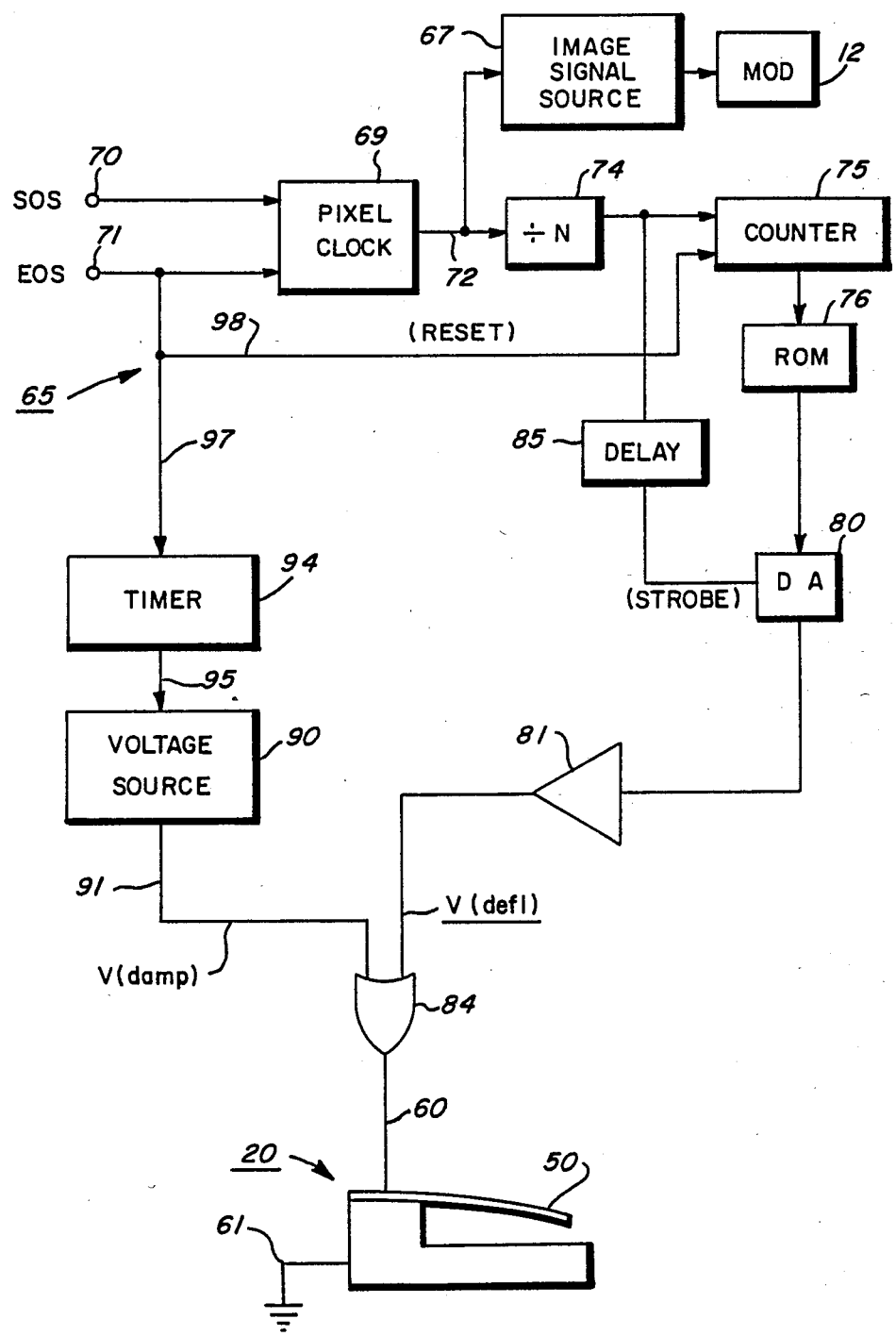
FIG. 6 is a logic diagram showing the control system for the raster scanner of FIG. 1 including means to dampen oscillations of the facet tracker flexible finger following removal of the bending potential.

Referring to FIG. 6, a control circuit, identified generally by the numeral 65, is provided for applying deflection or bending potentials via lead 60 to finger 50 of micro-deflector facet tracker 20 in synchronization with the rotation of scanning disc 46 and the sweep of scanning beam 15-2 across the photosensitive recording medium 13. A suitable source of image signals 67, which may for example comprise a memory, communication channel, and the like, is provided together with a suitable clock, referred to herein as pixel clock 69, the latter providing clock pulses for clocking the image signals from signal source 67 to modulator 12. A pair of photocell type sensors, identified herein as Start-Of-Scan (SOS) and End-Of-Scan (EOS) sensors 70, 71 respectively, are provided in the path of scanning beam 15-2 to identify the start and end of the image line on the photosensitive recording medium 13. The signal outputs of SOS and EOS sensors 70, 71 are input to the control terminals of pixel clock 69 to control starting and stopping of clock 69 in synchronization with the sweep of beam 15-2 across recording medium 13. The clock pulse output of clock 69 is fed via clock lead 72 to image signal source 67, and to the address counter 75 for a suitable non-volatile memory exemplified here by ROM memory 76 via divide by N counter 74. As indicated, the clock pulse output of pixel clock 69 to image signal source 67 clocks image signals to modulator 12. Modulator 12 in turn modulates beam 15 in synchronism with scanning of the beam 15-2 across the member 13 by deflector 24.

To enable the position of the spot where first order beam 15-1 impinges on the facets 47 of scanning disc 46 to be controlled throughout the scan, finger 50 of micro-deflector facet tracker 20 is bent or deflected in a controlled manner by application of a potential thereto. For this purpose, the output of ROM memory 76 is fed to a suitable digital-to-analog converter 80. The analog signal output of converter 80 is output to an amplifier 81 where the signal is suitably amplified to provide a potential V (defl) sufficient to cause finger 50 to bend or deflect in a controlled manner, the signal output of amplifier 81 being coupled through OR function gate 84 to lead 60 of facet tracker 20. A suitable delay circuit 85 is provided to enable the data input to converter 80 to settle prior to generation of potential V (defl). While a digital based system is illustrated herein, it will be understood that a pure analog control function for applying controlled potentials to finger 50, may instead be used.

The contents of ROM memory 76 are obtained through one or more calibration or test runs made to determine the potential V(defl) required to bend finger 50 by an amount necessary to keep the first order beam 15-1 centered on the facet 47 of scanning disc 46 during scanning. In FIG. 2, the relative positions of the first order beam 15-1 at Start Of Scan (SOS), Center Of Scan (COS) and End Of Scan (EOS) in relation to the deflection of finger 50 of facet tracker 20 are illustrated, it being understood that the positions shown are for example only and are not intended to reflect true positions of beam 15-1.

One of the principal requirements of finger 50 of facet tracker 20 is that the finger, following deflection, returns to the undeflected quiescent state prior to start of the next scan line. When the bending potential V(defl) in line 60 is removed from finger 50, finger 50, which can for purposes of explanation be considered as a cantilever beam, behaves like a damped free spring-mass vibratory system. Accordingly, finger 50 will return to the undeflected position over a time interval, referred to as recovery time Tr herein.

Recovery time Tr, which is defined as the time required for the micro-deflector finger 50 to return from a maximum deflected position (shown by solid lines in FIG. 4) to an undeflected quiescent position (the dotted line position of FIG. 4) under critical damping conditions, is approximately equal to the finger's natural period of vibration. Where for example, a finger 50 of the type described has a length $L=160$ $\mu$m, a width $w=100$ $\mu$m, a thickness $b=2$ $\mu$m, and depth $d=5$ $\mu$m, the finger has a natural frequency of approximately 73 KHz with a Q factor$=1.37$. If a maximum bending potential V (defl) of 51 volts is applied and then removed, finger 50 would typically oscillate with decreasing amplitude and return to an undeflected quiescent state in a time $Tr=30$ $\mu$sec.

Referring now particularly to FIG. 6, a source of dampening potential V (damp), shown here as voltage source 90, is provided, the output of voltage source 90 being coupled through lead 91 and gate 84 to lead 60 of finger 50. To control both the start and duration of the dampening potential V (damp), a timer 94 is provided. The signal output of timer 94 is input through lead 95 to the control terminal of voltage source 90. Lead 97 couples the output of EOS sensor 71 to the control terminal of timer 94.

Referring particularly to FIGS. 1, 2 and 5–7b, pixel clock 69 is actuated in response to the detection of scanning beam 15-2 by SOS detector 70. The clock pulse output of clock 69 actuates image signal source 67 to output a line of image signals to modulator 12 which modulates the beam 15 in accordance therewith to write an image line across the photosensitive recording medium 13. Concurrently, clock pulses output by pixel clock 69 drive counter 75 which, on reaching predetermined count levels, addresses preset memory locations in ROM 76. The resulting control signal output of ROM 76 to digital to analog converter 80 provides predetermined bending potentials V (defl) to finger 50 of facet tracker 20. Each predetermined bending potential applied to finger 50 causes finger 50 to bend or deflect by a predetermined amount (examples of which are shown in FIG. 2 of the drawings).

As described, finger 50 reflects the first order scanning beam 15-2 through beam expander 22 onto the facets 47 of the rotating scanning disc 46. As finger 50 bends or deflects, the point at which the scanning beam 15-1 impinges on a facet 47 of scanning disc 46 changes so that the position of the beam 15-1 against the facet of the scanning disc is in effect tracked along the facet as the facet moves to thereby maintain the point at which first order scanning beam 15-1 impinges against the facet substantially centered.

As the scanning beam 15-2 reaches the end of the scan line, the beam is detected by EOS sensor 71 and the signal from sensor 71 terminates operation of pixel clock 69 and the input of image signals from image signal source 67 to modulator 12. Concurrently, the signal from EOS sensor 71 in line 98 resets counter 75 to terminate the input of a bending potential V (defl) from amplifier 81 to finger 50.

Figure 7A:
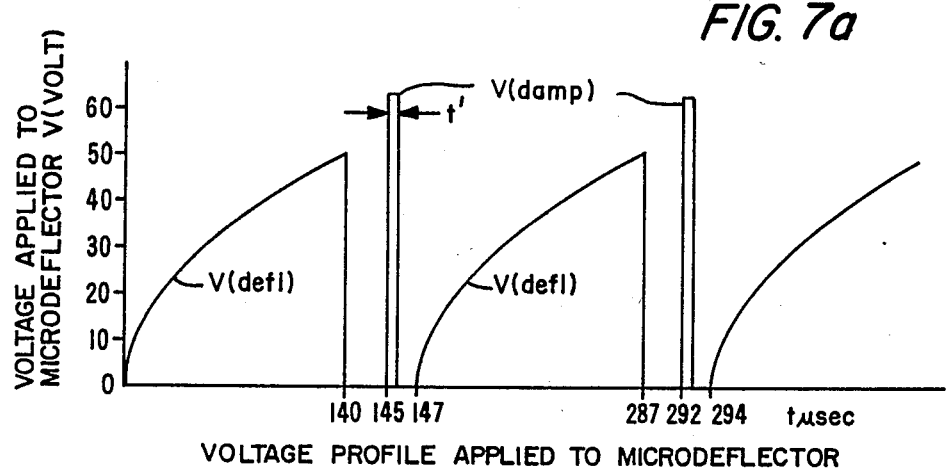
FIGS. 7a and 7b are graphical representations showing the relationship between deflection potential and the rate of deflection of the facet tracker finger.
Figure 7B:
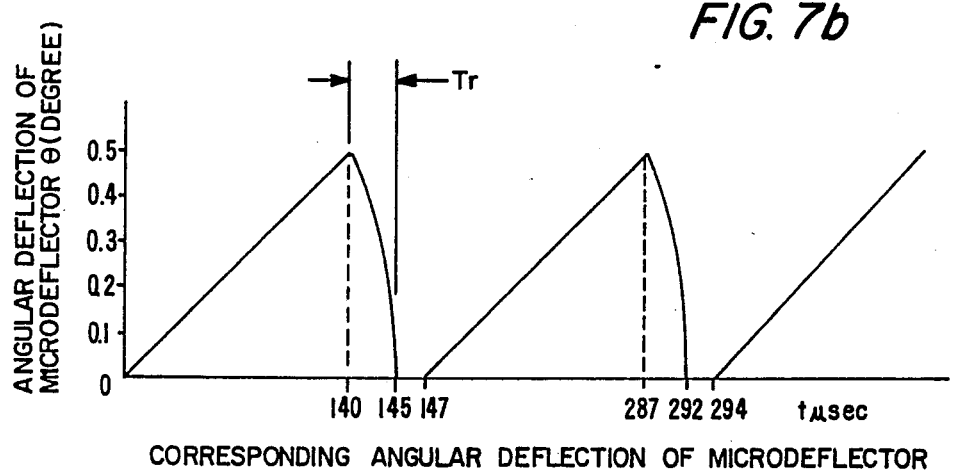

With the bending potential terminated, finger 50 returns to the undeflected position. The signal from EOS sensor 71 enables timer 94 which, following a predetermined delay chosen to permit the finger 50 to reach substantially the finger's undeflected position, actuates voltage source 90 to apply a predetermined dampening potential V (damp) to finger 50 for a preset interval t' (as illustrated in FIG. 7a). The dampening potential V (damp) quickly and rapidly dampens or inhibits any oscillations of finger 50 attending normal return of the finger 50 to the finger undeflected position and readies finger 50 for the next scan line.

It has been found that a dampening potential V (damp) of 62 volts over a interval $t'=0.25$ $\mu$sec and applied substantially at the time the finger 50 of facet tracker 20 reaches the undeflected position results in substantially instantaneous dampening of any oscillations of finger 50 and returns the finger from a point of maximum deflection to a neutral quiescent state in a recovery time Tr of approximately 5 $\mu$sec. Other wave forms for dampening finger 50 may be envisioned.

Figure 8:
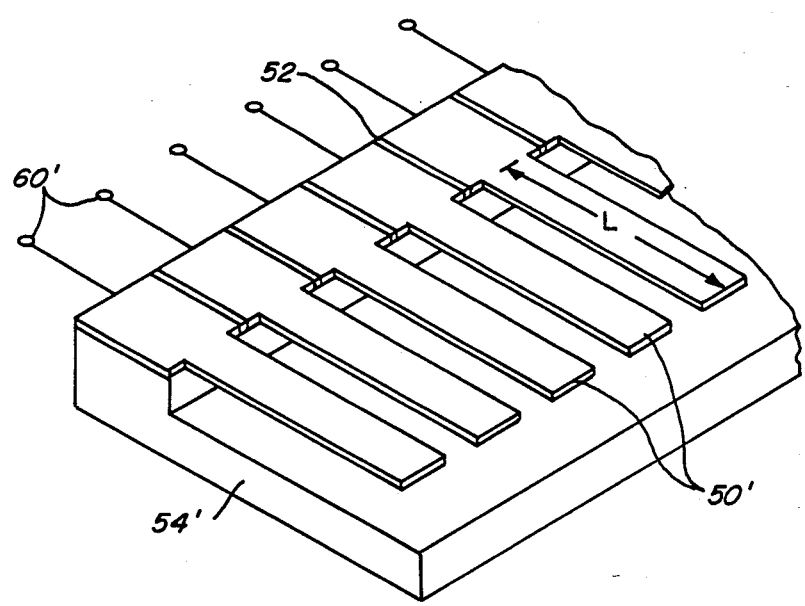
FIG. 8 is an isometric view depicting an array of flexible fingers for modulating an image line incorporating the oscillation dampening means of the present invention.

Other micro-deflector constructions and arrangements incorporating the invention may be readily envisioned, ie, a micro-deflector based modulator employing a single flexible finger to modulate the scanning beam in accordance with an image signal input, or employing one or more linear arrays of fingers such as shown in FIG. 8 and arranged to modulate across an entire scan line at once in response to an image signal input. Referring to FIG. 8, a succession or array of fingers 50' are provided on wafer 54', wafer 54' being extended in the axial direction for this purpose. Each finger 50' is electrically isolated from the adjoining finger at 52. Each finger 50' has a line 60' for inputting a bending potential in accordance with the content of an image signal representing the image to be reproduced and for inputting a predetermined dampening potential following temination of the bending potential to dampen oscillation of those fingers in the array to which the bending potential was applied. An example of the latter may be found in copending application Ser. No. 394,603, filed July 2, 1982 now U.S. Pat. No. 4,454,547, issued June 12, 1984, and incorporated by reference herein.

While the invention has been described with reference to the structure disclosed, it is not confined to the details set forth, but is intended to cover such modifications or changes as may come within the scope of the following claims.

We claim:

1. In a micro-deflector having at least one flexible finger with a mirror-like surface for reflecting a beam impinged thereagainst, and a support permitting the finger to deflect in response to the application of a first predetermined electrical potential thereto and reflect said beam in another direction, the improvement comprising:

control means to impose a second predetermined electrical potential on said finger following removal of said first potential whereby to dampen oscillations of said finger and speed up return of said finger to an undeflected position.

2. The micro-deflector according to claim 1 in which said finger comprises a linear array of flexible fingers.

3. The micro-deflector according to claim 1 including:
 (a) a beam stop;
 (b) a rotatable scanning element for sweeping said beam across the object to be scanned, said finger being disposed in the path of said beam upstream of said scanning element; and
 (c) means for selectively applying said first potential to said finger in response to an image signal input, in the absence of said first potential said finger remaining in said undeflected position and reflecting said beam onto one of said beam stop and scanning element, on application of said first potential said finger being moved to a deflected position and reflecting said beam onto the other of said beam stop and scanning element;
 (d) said return means imposing said second potential on said finger between image signals to assure return of said finger from said deflected position to said undeflected position prior to the next succeeding image signal.

4. The micro-deflector according to claim 1 in which said deflector includes
 (a) a plurality of fingers arranged in at least one row, said row of fingers being exposed to a sheet-like beam of light simultaneously whereby there is output by said row of fingers a linear succession of light rays;
 (b) means for controlling simultaneously application of said first potential to individual ones of said fingers in response to an image signal input, said image signal input comprising a block of image signals equal to the number of fingers that comprise said row, fingers which are deflected in response to said first potential reflecting the light rays striking said deflected fingers in a first path while undeflected ones of said fingers reflect the light rays striking said undeflected fingers in a second path, one of said first and second paths leading to a recording medium;
 (c) said return means imposing said second potential on said fingers between each of said blocks of image signals to assure return of any deflected fingers from said deflected position to said undeflected position prior to the next succeeding line of image signals.

5. The micro-deflector according to claim 1 in which said control means includes timing means to delay imposition of said second potential until said finger has reached said undeflected position whereby said second potential dampens oscillation of said finger.

6. The micro-deflector according to claim 5 in which said timing means actuates said second potential for a preset interval.

7. A facet tracker for use in tracking a beam of high intensity radiation to maintain the point where the beam impinges on the facets of a rotating scanning element substantially constant, comprising:
 (a) a base;
 (b) a flexible finger on said base, said finger projecting from said base in cantilever fashion and being deflectable toward and away from said base;
 (c) the outer surface of said finger having a reflective material for reflecting the beam onto the facets of a scanning element on disposition of said finger surface in the path of the beam upstream of the scanning element;
 said finger being adapted to deflect in response to application of an electrical bending potential thereto so that the point at which the beam reflected by said finger surface impinges on the scanning element facets can be controlled by controlling said electric bending potential whereby said beam can be tracked to maintain the point where said beam impinges on the scanning element facets substantially constant; and
 (d) control means for controlling the electrical bending potential applied to said finger to cause said finger to effect a predetermined bending motion so as to control the point at which the beam reflected by said finger surface impinges on said facets and track said beam to maintain the point where the beam impinges on said scanning element facets substantially constant;
 said control means applying a second electrical dampening potential to said finger following removal of said electrical bending potential to dampen oscillations of said finger and speed up return of said finger to the undeflected position.

8. The facet tracker according to claim 7 in which said control means includes timing means to delay imposition of said second electrical dampening potential until said finger has reached said undeflected position.

9. The facet tracker according to claim 8 in which said timing means actuates said second electrical dampening potential for a preset interval.

* * * * *